United States Patent Office.

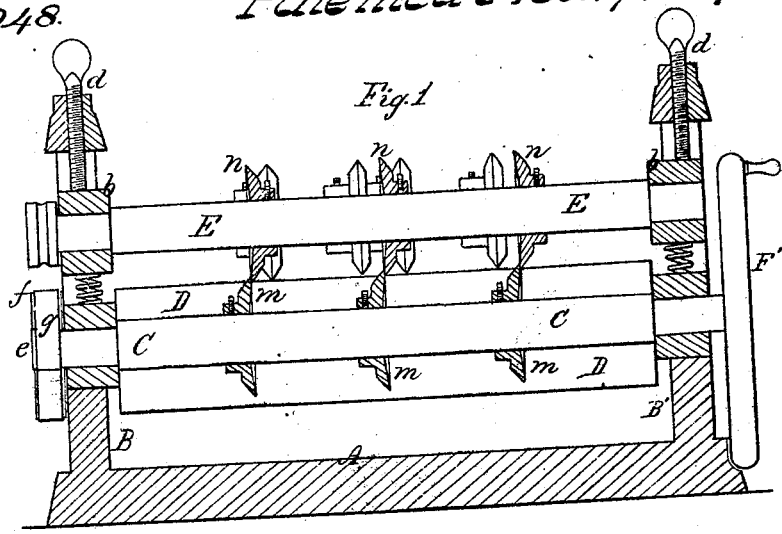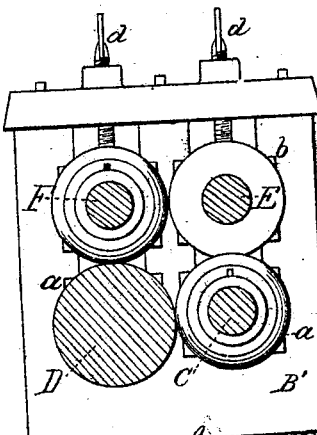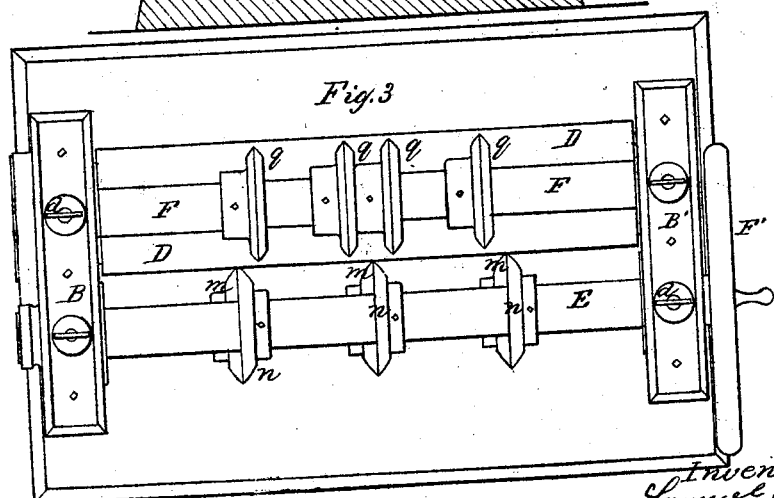

SAMUEL ORTH, OF PHILADELPHIA, PENNSYLVANIA.

Letters Patent No. 71,048, dated November 19, 1867.

---

IMPROVED MACHINE FOR CUTTING PASTEBOARD, &c.

---

The Schedule referred to in these Letters Patent and making part of the same.

---

TO ALL WHOM IT MAY CONCERN:

Be it known that I, SAMUEL ORTH, of Philadelphia, Pennsylvania, have invented an Improved Machine for Cutting and Scoring Straw and other Paper Boards; and I do hereby declare the following to be a full, clear, and exact description of the same.

My invention consists of two shafts with adjustable cutting disks, combined with a shaft having adjustable scoring disks, and with a roller, the whole being constructed and arranged substantially as described hereafter, for the simultaneous cutting and scoring of straw and other boards prior to the conversion of the same into paper boxes, and for the ready adjustment of the several disks without crowding the same on each other.

In order to enable others skilled in the art to make and use my invention, I will now proceed to describe its construction and operation, reference being had to the accompanying drawing, which forms a part of this specification, and in which—

Figure 1 is a vertical section of my improved machine for cutting and scoring straw and other boards;

Figure 2 a transverse vertical section, and

Figure 3 a plan view.

Similar letters refer to similar parts throughout the several views.

A is the base of the machine, secured to or forming a part of which are the two standards B and B', each of the latter having two permanent bearings or boxes, $a$ and $a'$, for the shaft C, and for the journals of the roller D. In boxes $b$, arranged to slide in guides formed in the standards B and B', and controlled by screws $d$ $d$, turn the shafts E and F. The shaft C is provided at one end with a handled fly-wheel, F', and has at the opposite end a small pulley, $e$, for receiving a belt, $g$, which passes round a larger pulley, $f$, on one of the projecting journals of the roller D. On the shaft C are any required number of cutting disks, $m$, which can be adjusted to any desired position and secured after adjustment, and on the shaft E are corresponding cutting disks, each of which is so adjusted that its flat or slightly-concave side shall be in contact with that of one of the lower disks, which it overlaps to a very limited extent. On the shaft F are the scoring disks $q$, which can also be adjusted longitudinally on the shaft, and secured after adjustment, the edge of each of these disks being bevelled on each side, and being blunt compared with the edges of the cutting disks, and revolving nearly in contact with the surface of the roller D.

In preparing straw and other boards for conversion into paper boxes, each board has to be cut to a proper length and width, and scored at the points where it has to be turned up to form the sides and ends of the box. It becomes necessary in many cases to score the board very near to the line where it has to be cut; so near, in fact, that the scoring and cutting-wheels could not be crowded together on one shaft; hence I have devoted the two shafts D and F to the cutting disks, while the scoring is accomplished by the combined action of the disks $q$ on the shaft F and the roller D. It will be evident that by this arrangement the scoring disks may be so adjusted on their shaft in respect to the cutting disk that the scoring of the straw board may take place in a line close to the severed edges, at that the adjustment of the cutting and scoring disks may be readily effected without interfering with each oth .

I claim as my invention, and sire to secure by Letters Patent—

The shafts D and E, with thei adjustable disks $m$ and $n$, in combination with the shaft F and its adjustable disks $q$ and the roller D, the whol being constructed and arranged for the simultaneous cutting and scoring of straw and other boards, substanti lly as set forth.

In testimony whereof I have signed my name to this specification in the presence of two subscribing witnesses.

SAM. ORTH.

Witnesses:
C. E. FOSTER,
W. J. R. DELANY.